Oct. 11, 1966 R. P. ZELINSKI 3,278,644
COMPOSITIONS OF REDUCED COLD FLOW COMPRISING
A BLEND OF TWO BUTADIENE HOMOPOLYMERS
Filed Nov. 20, 1961 2 Sheets-Sheet 1

INVENTOR.
R. P. ZELINSKI
BY *Hudson and Young*
ATTORNEYS

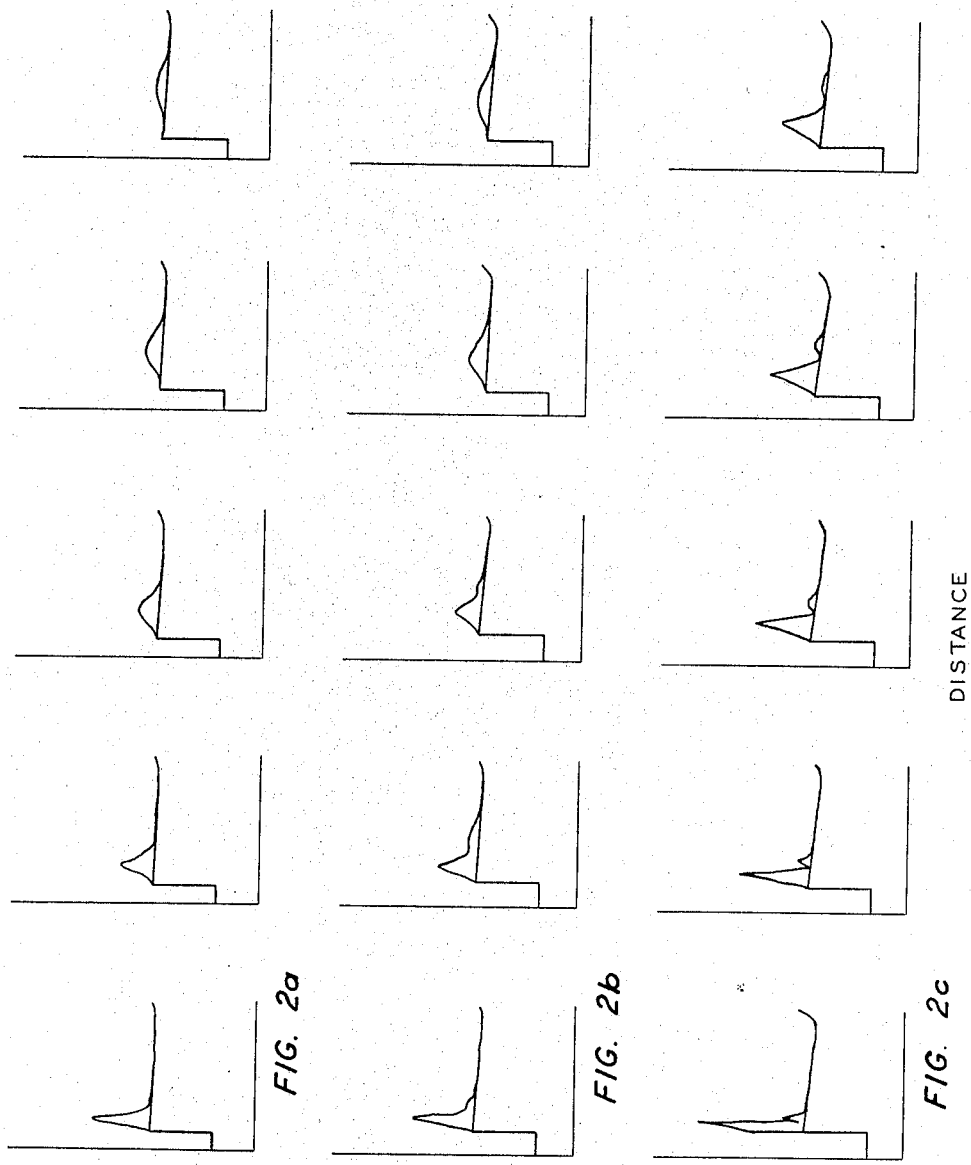

United States Patent Office 3,278,644
Patented Oct. 11, 1966

3,278,644
COMPOSITIONS OF REDUCED COLD FLOW COMPRISING A BLEND OF TWO BUTADIENE HOMOPOLYMERS
Robert P. Zelinski, Bartlesville, Okla., assignor to Phillips Petroleum Company, a corporation of Delaware
Filed Nov. 20, 1961, Ser. No. 153,357
4 Claims. (Cl. 260—894)

This invention relates to rubber compositions.

Among the various new polymers developed from the solution polymerization of conjugated dienes using organometal initiator systems are the cis-polymers of butadiene. The physical properties of these polymers are such as to make them particlarly suitable for heavy duty tires and other articles for which most synthetic rubbers have heretofore been relatively unsatisfactory.

In the manufacture and processing of these polymers and particularly in their packaging, shipping, and storage, certain difficulties have been encountered from their tendency to cold-flow in the unvulcanized state. For example, in the event of cracks or punctures in a package, polymer flows therefrom, leading to product loss or contamination, sticking together of packages, and the like.

An object of this invention is to reduce cold-flow of these polymers. A further object of this invention is to provide new rubber compositions. A further object of this invention is to produce bimodal and polymodal cispolybutadiene. A further object of this invention is to provide a method for producing these compositions.

Accompanying and forming a part of this disclosure is a drawing comprising two figures.

FIGURE 2 shows three series of curves identified as FIGURE 2a, FIGURE 2b, and FIGURE 2c, these showing the results of studies of three polymer products by the sedimentation velocity method using an ultracentrifuge. These curves are discussed in Example III.

Figure 1:
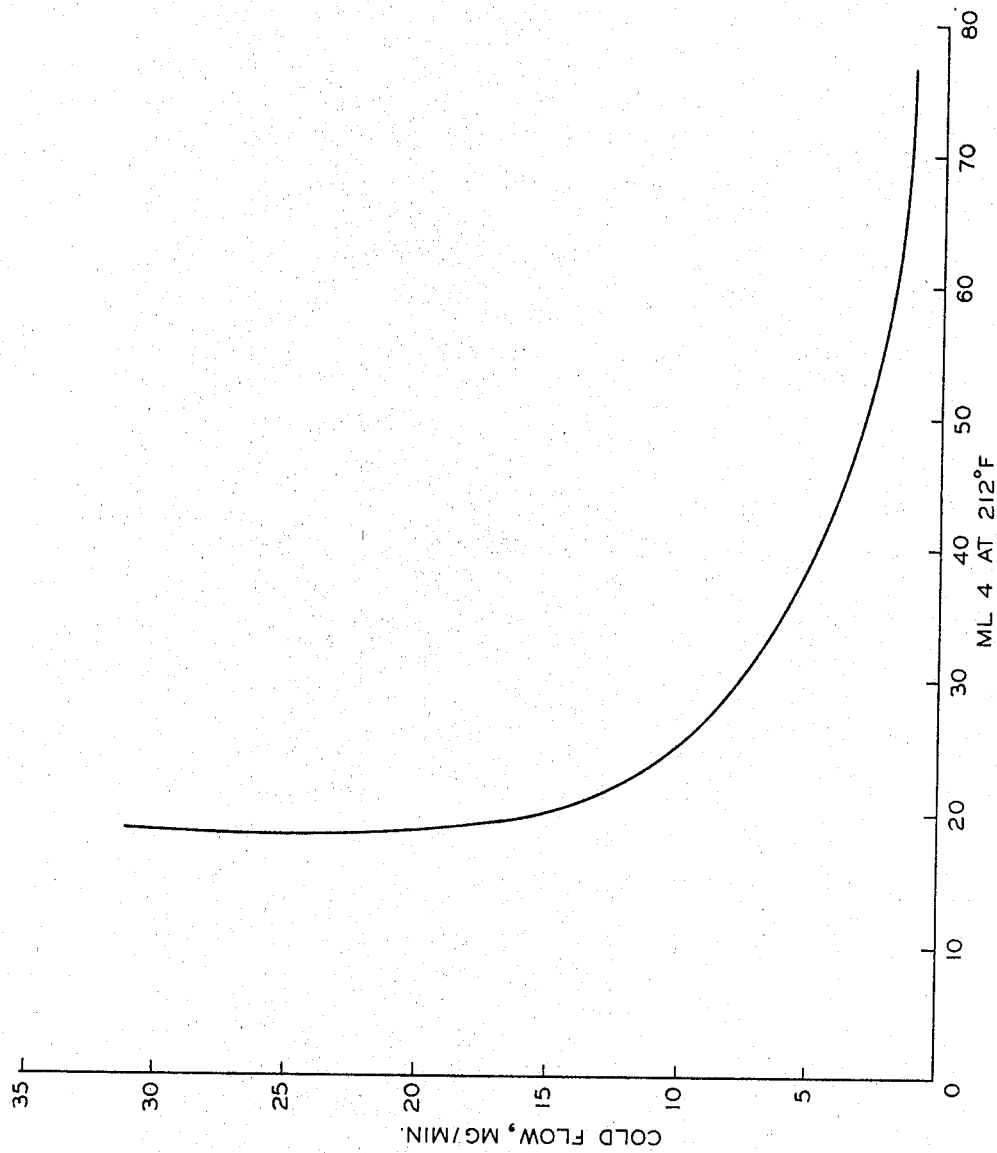
FIGURE 1 is a graph showing the relationship between cold-flow and Mooney value of polybutadiene formed by approximately 95 percent cis-1,4-addition, each individual polymer having been prepared by a one-step polymerization process and without blending of any of the polymers. The total initiator ingredients were charged to reaction zone prior to the occurrence of any polymerization.

Broadly, my invention comprises new rubbery products comprising bimodal and polymodal cis-polybutadienes. More specifically the products comprise (A) polybutadiene having an inherent viscosity of 0.75 to 3, said polybutadiene formed by 85 to 100 percent cis-1,4-addition and (B) polybutadiene having an inherent viscosity of 6 to 20, the weight of (B) being up to 40 weight percent of the total of (A) plus (B). The cis-polybutadiene identified as component (A) generally contains some trans-1,4 and vinyl addition, the important limitation being the minimum of 85 percent cis-1,4-addition. Preferably component (B) has structure within the limits for component (A). Component (A) and component (B) can each contain a mixture of two or more polymers having properties within the ranges given. The invention further comprises methods of preparing such a rubbery product.

It has now been found that substantial reduction in cold-flow of rubbery cis-polybutadiene can be readily achieved by incorporating therein a minor amount of polybutadiene of very high inherent viscosity. In one method for obtaining a homogeneous composition, solutions of the polymers are blended and the products are recovered by conventional means such as steam stripping, coagulation in isopropyl alcohol, or the like. A convenient method is to blend the polymer solutions as they are obtained from the reactor. Other methods include blending by milling the solid polymers together. This can be done on a two-roll mill, in a Banbury mixer, etc.

Yet another method of obtaining such a mixture is to use a two-step polymerization process as disclosed in a copending application of F. E. Naylor Serial No. 153,354, filed November 20, 1961 now U.S. Patent No. 3,182,052. Reference is made thereto for details of the process. An example of this process appears in Example III herein.

The polybutadiene employed in the minor proportion has an inherent viscosity of at least 6, generally in the range of 6 to 20 or even higher, and it is preferably above 10. Processable compositions containing 2 to 40 weight percent of this material can be prepared but the amount is generally in the range of 5 to 30 weight percent of the blend. The amount of this polymer used will depend upon its inherent viscosity, the inherent viscosity, or Mooney value of the polymer used in major proportion, and the type of product desired.

Cis-polybutadiene compositions prepared as herein described have Mooney values in the range of 10 to 70 but, for most purposes, Mooney values in the range of 20 to 50 are preferred (ML–4 values).

When cis-polybutadiene, 85 percent cis content or higher, is prepared by conventional polymerization processes to a Mooney value of around 25, it has reasonably good processing properties but excessive tendency to cold-flow. When prepared to a higher Mooney value, the tendency to cold-flow is not so great but processing becomes difficult. This invention provides a means whereby compositions of fairly low Mooney value can be prepared which have minimum cold-flow tendencies and have satisfactory processing characteristics.

The cis-polybutadiene employed for each of the components in the compositions of this invention can be prepared by any suitable means by varying initiator level and reaction conditions to give the type of polymer desired. One procedure comprises polymerizing butadiene in a hydrocarbon diluent in the presence of an initiator system comprising an organoaluminum compound used in conjunction with titanium tetraiodide, a mixture of titanium tetrachloride and titanium tetraiodide, or a mixture of titanium tetrachloride and iodine. Other processes which yield high cis polymers can also be used.

The polybutadiene having the high inherent viscosity which is a component of the compositions of my invention can be prepared in many other ways. These methods have been explored by prior workers in the polymerization field. They can be prepared by using organolithium catalyst such as butyllithium and a lithium-methylnaphthalene adduct, for example. Polymers produced with organolithium catalyst are somewhat less desired because the final product does not have as high a cis content but, as the high inherent viscosity material is used in a minor amount, such polymers can be considered suitable. Also, the use of organolithium polymerized polybutadiene does not reduce the cold-flow to as great an extent as does the use of a similar polymer having a high cis content.

Also, emulsion polymerization systems can be used to prepare the polymer of high inherent viscosity, the only important criterion here being that the polymerization should be controlled to give a substantially gel-free polymer.

The new products disclosed herein are known as "bimodal" of "polymodal" cis-polybutadienes. These terms were adopted because of the plurality of "modes" or "humps" in the molecular weight distribution curve when compared to the usual products which have a comparatively narrow molecular weight range. The usual compounding recipes in preparing vulcanized products are used including softeners, fillers, and curatives. It is sometimes desirable to blend the polymodal cis-polybutadiene with SBR, natural rubber, and the like.

The following examples illustrate my invention.

*Example I*

A series of base polymers was prepared having a Mooney range from approximately 0.5 to 28 Mooney (ML–4 at 212° F.). In this series dry toluene was added to the reaction vessel which was purged for five minutes with nitrogen and then closed. Butadiene, triisobutylaluminum (TBA), iodine, and titanium tetrachloride (TTC) were then added in that order and the butadiene polymerized at 41° F. for 16 hours. The mol ratio of initiator components, TBA/$I_2$/TTC, was 6/1.75/1 and the amount used was in the range to provide TTC in the range of 0.43 to 0.91 gram millimols per 100 grams of monomer (mhm.). Polymerization was terminated by addition of one part by weight, based upon the monomer, of 2,2′ - methylene - bis(4 - methyl - 6 - tertiarybutylphenol) as a 10 weight percent solution in a 75/25 volume ratio toluene/isopropyl alcohol solvent. As the solvent for the polymerization, 1100 parts of toluene was used per 100 parts of the monomer on a weight basis. Polymerization data and properties of the products are shown in the following table:

mixing predetermined quantities of each of the solutions. The resulting mixtures were agitated at 122° F. for 12 to 18 hours. The blended polymers were isolated by pouring them into isopropyl alcohol, separating the polymer and drying in a vacuum oven at 140° F. Blends were prepared by mixing 5 to 60 weight percent of polymers with an inherent viscosity range of 6.3 to 12.7 with polymers having an inherent viscosity in the range of 0.97 to 2.12. Recipes and properties of these bimodal polymers are set forth in Tables I–IV:

TABLE I

[Blends of high molecular weight polymer with 0.5 ML–4 polymer]

| Run No. | High Mol. Wt. | | Blend Viscosity | | Cold Flow |
|---|---|---|---|---|---|
| | Inherent Viscosity | Percent in Blend | Mooney ML–4 | Inherent | |
| 1 | 12.7 | 20 | 13 | 3.42 | 0.9 |
| 2 | 11.6 | 20 | 11 | 3.09 | 1.6 |
| 3 | 10.1 | 20 | 10 | 2.91 | 2.1 |
| 4 | 7.7 | 20 | 10 | 2.54 | 3.6 |
| 5 | 6.3 | 20 | 15 | 2.59 | 3.3 |
| 6 | 12.7 | 30 | 14 | 4.57 | 0.2 |
| 7 | 10.1 | 30 | 24 | 4.06 | 0.8 |
| 8 | 7.7 | 30 | 20 | 4.02 | 1.0 |
| 9 | 6.3 | 30 | 25 | 2.78 | 1.5 |
| 10 | 12.7 | 40 | 20 | 5.32 | 0.0 |
| 11 | 10.1 | 40 | 23 | 4.47 | 0.0 |
| 12 | 7.7 | 40 | 33 | 4.00 | 0.0 |
| 13 | 6.3 | 40 | 36 | 3.48 | 0.5 |
| 14 | 12.7 | 50 | 31 | 7.15 | 0.0 |
| 15 | 10.1 | 50 | 56 | 6.29 | 0.0 |
| 16 | 7.7 | 50 | 56 | 4.61 | 0.0 |
| 17 | 10.1 | 60 | 57 | 6.64 | 0.0 |
| 18 | 7.7 | 60 | 74 | 5.11 | 0.0 |

| Run No. | TTC, mhm. | Conversion, Percent | Viscosity | | Microstructure, Percent | | |
|---|---|---|---|---|---|---|---|
| | | | ML–4 | Inherent | trans | Vinyl | cis |
| 1 | 0.43 | 100 | 28 | 2.12 | 2.6 | 3.2 | 94.2 |
| 2 | 0.60 | 95 | 12 | 1.62 | 3.8 | 3.2 | 93.0 |
| 3 | 0.45 | 100 | 22 | 1.95 | 3.4 | 3.2 | 93.4 |
| 4 | 0.91 | 60 | 0.5 | 0.97 | 3.7 | 3.4 | 92.8 |

A series of high molecular weight polymers was prepared in a similar reaction vessel at 41° F. Initiation was done with a triisobutylaluminum-titanium tetraiodide initiator. The reaction was terminated by addition of an alcoholic solution of the antioxidant used above, the amount of antioxidant being 2 weight percent based upon the monomer charge. The recipe for the production of these polymers is shown in the following table:

| | Parts by weight |
|---|---|
| Butadiene | 100 |
| Toluene | 1100 |
| Triisobutylaluminum (TBA) (0.63 to 1.62 mhm.) | 1.25 to 3.2 |
| Titanium tetraiodide (TTI) (0.02 to 0.12 mhm.) | 0.01 to 0.06 |
| Temperature, ° F. | 41 |
| Time, hours | 2 or 15 |

Both the high and low molecular weight materials were retained in the solvents and the blends were prepared by

TABLE II

[Blends of high molecular weight polymer with 12 ML–4 polymer]

| Run No. | High Mol. Wt. | | Blend Viscosity | | Cold Flow |
|---|---|---|---|---|---|
| | Inherent Viscosity | Percent in Blend | Mooney ML–4 | Inherent | |
| 1 | 12.7 | 5 | 14 | 2.06 | 9.2 |
| 2 | 11.6 | 5 | 14 | 2.03 | 9.4 |
| 3 | 12.7 | 10 | 18 | 2.74 | 2.3 |
| 4 | 11.6 | 10 | 18 | 2.63 | 2.7 |
| 5 | 10.1 | 10 | 17 | 2.48 | 3.7 |
| 6 | 7.7 | 10 | 15 | 2.19 | 8.7 |
| 7 | 6.3 | 10 | 15 | 2.02 | 9.7 |
| 8 | 12.7 | 20 | 27 | 3.67 | 0.4 |
| 9 | 11.6 | 20 | 26 | 3.24 | 0.8 |
| 10 | 10.1 | 20 | 26 | 3.51 | 0.6 |
| 11 | 7.7 | 20 | 25 | 2.93 | 2.8 |
| 12 | 6.3 | 20 | 24 | 2.83 | 2.2 |
| 13 | 12.7 | 30 | 36 | 4.88 | 0.0 |
| 14 | 11.6 | 30 | 38 | 4.56 | 0.0 |
| 15 | 10.1 | 30 | 36 | 4.10 | 0.2 |
| 16 | 7.7 | 30 | 37 | 3.53 | 1.0 |
| 17 | 6.3 | 30 | 36 | 3.07 | 1.9 |
| 18 | 10.1 | 40 | 50 | 4.87 | 0.0 |
| 19 | 7.7 | 40 | 49 | 4.40 | 0.2 |
| 20 | 6.3 | 40 | 49 | 4.25 | 0.0 |
| 21 | 7.7 | 50 | 62 | 4.91 | 0.0 |
| 22 | 6.3 | 50 | 61 | 4.59 | 0.0 |

TABLE III
[Blends of high molecular weight polymer with 22 ML-4 polymer]

| Run No. | High Mol. Wt. | | Blend Viscosity | | Cold Flow |
|---|---|---|---|---|---|
| | Inherent Viscosity | Percent in Blend | Mooney ML-4 | Inherent | |
| 1 | 12.7 | 5 | 27 | 2.41 | 2.6 |
| 2 | 11.6 | 5 | 25 | 2.29 | 2.8 |
| 3 | 10.1 | 5 | 25 | 2.27 | 2.8 |
| 4 | 12.7 | 10 | 32 | 3.02 | 0.7 |
| 5 | 11.6 | 10 | 30 | 2.96 | 0.7 |
| 6 | 10.1 | 10 | 31 | 2.67 | 1.8 |
| 7 | 7.7 | 10 | 33 | 2.53 | 2.5 |
| 8 | 6.3 | 10 | 32 | 2.49 | 2.4 |
| 9 | 12.7 | 20 | 51 | 4.50 | 0.3 |
| 10 | 11.6 | 20 | 45 | 3.95 | 0.0 |
| 11 | 10.1 | 20 | 47 | 3.58 | 0.0 |
| 12 | 7.7 | 20 | 48 | 3.40 | 0.7 |
| 13 | 6.3 | 20 | 46 | 3.00 | 0.8 |

TABLE IV
[Blends of high molecular weight polymer with 28 ML-4 polymer]

| Run No. | High Mol. Wt. | | Blend Viscosity | | Cold Flow |
|---|---|---|---|---|---|
| | Inherent Viscosity | Percent in Blend | Mooney ML-4 | Inherent | |
| 1 | 12.7 | 5 | 30 | 2.66 | 2.1 |
| 2 | 11.6 | 5 | 28 | 2.54 | 2.6 |
| 3 | 10.1 | 5 | 29 | 2.46 | 2.4 |
| 4 | 7.7 | 5 | 30 | 2.60 | 3.6 |
| 5 | 6.3 | 5 | 28 | 2.17 | 3.6 |
| 6 | 12.7 | 10 | 36 | 3.54 | 1.0 |
| 7 | 11.6 | 10 | 35 | 3.03 | 1.1 |
| 8 | 10.1 | 10 | 35 | 2.80 | 1.5 |
| 9 | 7.7 | 10 | 34 | 2.70 | 1.5 |
| 10 | 6.3 | 10 | 33 | 2.90 | 1.7 |

Cold-flow was determined by extruding the rubber through a ¼-inch orifice having a length of 0.107 inch at 3.5 p.s.i. pressure at a temperature of 122° F. After allowing 10 minutes to reach steady state, the rate of extrusion is measured and the value reported in milligrams per minute.

Examination of the data in Tables I–IV illustrate the reduction in cold flow obtained by my invention. While polymers with zero cold-flow would be desirable for some purposes, it has been found that such materials are somewhat difficult to process at conventional temperatures. For this reason, it is frequently desirable to prepare a product having a small cold-flow, say up to 1.5 or 2, determined by the above method, in order to obtain better processing. In general, the processing will be improved by raising the temperature and higher temperatures must be used as the cold flow is reduced.

Example II

Polybutadiene having a cis content of approximately 95 percent was prepared with a triisobutylaluminum-iodine-titanium tetrachloride initiator. A portion of this material having an inherent viscosity of 1.47 and a Mooney viscosity (ML-4 at 212° F.) of 10 had a cold flow in milligrams per minute of 58. This material was mixed with a high molecular weight polybutadiene prepared according to the following recipe:

| | Parts by weight |
|---|---|
| Butadiene | 100 |
| Cyclohexane | 960 |
| Lithium-Methylnaphthalene adduct (0.4 mhm.) | 0.06 |
| Temperature, ° F. | 122 |
| Time, hrs. | 16 |

The resulting polymer had an inherent viscosity of 6.3. It was mixed in amounts to provide 10, 20, and 30 weight percent in the total blend, the resulting cold-flow for these blends being, respectively, 22.4, 6.4, and 1.7.

Example III

This example, with FIGURE 2, is presented to show the presence of the two types of polymer in the products of my invention and to show their presence can be definitely determined. For this work three polymer products were used.

The first product was prepared at 5° C. by the conventional one-step process in which all of the initiator ingredients were added prior to polymerization. The recipe was

| | Parts by weight |
|---|---|
| 1,3-butadiene | 100 |
| Toluene | 1200 |
| Triisobutylaluminium (TBA) (2.0 mmoles) | 0.396 |
| Titanium tetraiodide (TTI) (0.250 mmole) | 0.139 |
| Titanium tetrachloride (TTC) (0.250 mmole) | 0.048 |
| TBA/TTI/TTC Mole ratio | 8/1/1 |

Toluene was first charged followed by the butadiene. The mixture was cooled to 5° C. and polymerization was initiated by adding the triisobutylaluminum in toluene followed by a mixture of titanium tetraiodide and titanium tetrachloride in toluene. After 6 hours the conversion was 94 percent and a product having an inherent viscosity of 2.71 was obtained.

The second product was an 80/20 weight percent blend of low (1.77) inherent viscosity cis-polybutadiene and high (9.5) inherent viscosity cispolybutadiene.

The low inherent viscosity polymer was prepared by charging 1200 parts by weight of toluene to a reactor which was then purged with nitrogen and 100 parts by weight of 1,3-butadiene was then added. A small amount of a TBA/TTI preformed initiator (prepared from a 2/1 mole ratio of TBA/TTI) was introduced, the amount used being 0.0185 mmole, based on TTI. Within 5 minutes 2.4 mmoles TBA, 0.79 mmole $I_2$, and 0.42 mmole TTC, each in toluene solution, were introduced in the order named. Polymerization had not started until after all the initiator was charged. After a reaction time of 4.5 hours at 5° C., conversion had reached 75 percent. The polymer had an inherent viscosity of 1.77 and a Mooney value (ML-4 at 212° F.) of 12.

The preformed initiator used for this run was prepared by agitating a mixture of 1.85 mmoles TTI, 3.70 mmoles TBA, and 110 ml. toluene for 30 minutes at room temperature. The solid portion was allowed to settle and the supernatent liquid removed. The solid was redispersed in 100 ml. of toluene and this material employed as the initial initiator charge in the foregoing run.

For the high inherent viscosity polymer a reactor was charged with 1100 parts by weight of toluene after which it was purged with nitrogen and 100 parts by weight of 1,3-butadiene and 0.75 mmole per 100 grams of monomer of TBA were added in the order named, the latter material serving as a scavenger for the system. The mixture was cooled to 5° C. and 0.24 mmole per 100 grams monomer of a preformed TBA/TTI initiator (quantity based on TBA) was added. Polymerization was carried out at 5° C. for a period of 15 hours and conversion was quantitative. The polymer was gel free and had an inherent viscosity of 9.5.

The preformed initiator employed in the foregoing run was prepared by charging 96.5 ml. of n-hexane to a reactor which was then purged with nitrogen, 1.1352 grams (2.04 mmoles) of TTI was added, the mixture was agitated to disperse the TTI, and 4.08 mmoles of TBA in toluene was introduced. After 15 minutes agitation at room temperature, the solid was allowed to settle, the soluble portion was removed, and the insoluble portion was redispersed in toluene. This dispersion was used as the initiator. It was assumed that all TBA charged was present in this portion.

The third product was a bimodal polymer prepared by the two-step method of Naylor described in application Serial No. 153,354, filed November 20, 1961, and now U.S. Patent No. 3,182,052. The recipe for the first step was as follows:

| | |
|---|---|
| Toluene, grams | 1100 |
| 1,3-butadiene, grams | 100 |
| TBA, mmole | 0.5 |
| TTI, mmole | 0.03 |

Toluene was charged first, the reactor was purged with nitrogen, butadiene was added, and then the TBA. The mixture was cooled to 5° C., TTI was introduced, and polymerization was effected at 5° C. for one hour 17 minutes at which time conversion had reached 20.6 percent. The polymer was gel free and had an inherent viscosity of 10.79.

To the above reaction mixture 3 mmoles TBA, 1.05 mmoles $I_2$, and 0.6 mmole TTC were added. Polymerization was allowed to proceed to a total reaction time of 22 hours (time includes first step). Conversion was quantitative. The polymer was gel free and had an inherent viscosity of 3.65. The Mooney value (ML-4 at 212° F.) was 29.2.

Solutions of each of these products were analyzed by the sedimentation velocity method using an ultracentrifuge. This method is described in "Ultracentrifugation, Diffusion, and Viscometry," by H. K. Schachman, copyright 1957 by Academic Press Inc., the material being reprinted from volume IV of "Methods in Enzymology." Pages 33, 34, 37, 38, 52–58 are most pertinent. The Spinco Model E centrifuge described on page 37 was used. The work was carried out at 25° C. and 42040 r.p.m. using 12 mm. cells. A phase plate was used as the schlieren diaphragm and Kodak Metallographic plates with a green filter in the optical system. As pointed out in page 52 of the reference, this method indicates whether one or more molecular species is present in a solution, provided these different molecules show variations in molecular size and shape.

In each case the determination was made using a solution of the product in normal hexane. Prints were made at intervals of 480 seconds and, from these prints, the distance to the peak or peaks measured and the sedimentation coefficients determined. Drawings made from these prints are shown in FIGURE 2.

FIGURE 2a was obtained using a solution containing 0.3 gram of the first rubber product of this example in normal hexane (100 ml.). From the symmetrical nature of the curve it is apparent that there is substantially only one molecular species present. The data are shown in the following table, $x$ being the distance in centimeters from the axis of rotation.

TABLE V

| Run No. | Time, Seconds | x, cm. |
|---|---|---|
| 1 | 480 | 6.061 |
| 2 | 960 | 6.146 |
| 3 | 1,440 | 6.230 |
| 4 | 1,920 | 6.320 |
| 5 | 2,400 | 6.417 |

Sedimentation coefficient: 14.98.

FIGURE 2b was obtained using a solution containing 0.3 gram in 100 ml. of normal hexane of the second rubber product of this example, the bimodal polymer prepared by solution blending. Two different polymer species are present and this is indicated by two humps in the curve. The data are shown in the following table, no distances being given for last three times for the high inherent viscosity polymer since the peak is not well defined.

TABLE VI

| Run No. | Time, seconds | x (slow moving peak) | x (fast moving peak) |
|---|---|---|---|
| 1 | 480 | 6.111 | 6.261 |
| 2 | 960 | 6.179 | 6.415 |
| 3 | 1,440 | 6.237 | |
| 4 | 1,920 | 6.306 | |
| 5 | 2,400 | 6.384 | |

Sedimentation coefficients:
fast (high inherent viscosity polymer), 22.9.
slow (low inherent viscosity polymer), 11.8.

FIGURE 2c was obtained using a solution containing 0.3425 gram in 100 ml. of normal hexane of the third rubber product of this example, the bimodal polymer prepared by two-step polymerization. Two different polymer species are present and this is indicated by two distinct humps in the curve. The data are shown in the following table:

TABLE VII

| Run No. | Time, seconds | x (slow moving peak) | x (fast moving peak) |
|---|---|---|---|
| 1 | 480 | 6.088 | 6.151 |
| 2 | 960 | 6.125 | 6.260 |
| 3 | 1,440 | 6.172 | 6.370 |
| 4 | 1,920 | 6.214 | 6.476 |
| 5 | 2,400 | 6.254 | 6.579 |

Sedimentation coefficients:
fast (high inherent viscosity polymer), 18.71.
slow (low inherent viscosity polymer), 6.795.

FIGURE 1 of the drawing which accompanies this application is based upon data obtained from the large number of determinations of cold-flow as it is related to the Mooney viscosity of cis-polybutadiene containing approximately 95 percent cis-1,4-addition. The relationship between cold flow and viscosity is not greatly affected by changes in cis content in the range of 85 to 100 percent. Each of the polymers used in preparing this curve was prepared in a one-step process in which all of the initiator ingredients were charged prior to the occurrence of polymerization. From this graph, it is possible to compare the improvement obtained when operating according to my invention and the properties of the unblended material. In the desired Mooney range, the cold-flow is very high. Products of the desired Mooney range having very low, or zero, cold-flow are obtained by this invention.

For the inherent viscosity determination, one tenth gram of polymer was placed in a wire cage made from 80 mesh screen and the cage was placed in 100 ml. of toluene contained in a wide-mouth, 4-ounce bottle. After the polymer remained in contact with the solvent for 24 hours at room temperature (approximately 25° C.), the cage was removed and the solution filtered to remove any solid particles present. The resulting solution was run through a Medalia-type viscometer supported in a 25° C. temperature bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

To determine the amount of the addition of the various types, the polymers can be dissolved in carbon disulfide to form a solution having 25 grams of polymer per liter of solution. The infrared spectrum of such a solution (percent transmission) is then determined in a commercial infrared spectrometer.

The percent of the total unsaturation present as trans 1,4- is calculated according to the following equation and consistent units: $\epsilon = E/tc$ where:

$\epsilon$ = extinction coffiecient (liters-mols$^{-1}$-centimeters$^{-1}$);
$E$ = extinction (log $I_o/I$); $t$ = path length (centimeters); and $c$ = concentrations (mols double bond/liter). The extinction is determined at the 10.35 micron band and the extinction coefficient used is 146 (liters-mols$^{-1}$-centimeters$^{-1}$).

The percent of the total unsaturation present as 1,2- (or vinyl) is calculated according to the above equation, using the 11.0 micron band and an extinction coefficient of 209 (liters-mols$^{-1}$-centimeters$^{-1}$).

The percent of the total unsaturation present as cis 1,4- is obtained by substracting the trans 1,4- and 1,2- (vinyl) determined according to the above methods from the theoretical unsaturation assuming one double bond per each $C_4$ unit in the polymer.

The presence of the polymers of different inherent viscosity can be determined by fractionation of an unvulcanized sample thereof. For instance, 10 grams of the polymer is dissolved in 1 liter of toluene and this solution placed in a 2-liter separatory funnel positioned in a constant temperature bath maintained at 25° C. While agitating the solution, a non-solvent, methanol and isopropanol being preferred, is added until the mixture becomes cloudy. As much as 250 milliliters of the alcohol may be necessary for this first precipitation. The mixture should then be warmed so that all of the polymer goes into solution, this being evidenced by the solution becoming clear. The mixture should then be left in the 25° C. bath for 12 to 24 hours so that equilibrium can be obtained. The precipitated polymer forms as a viscous liquid in the bottom of the funnel and is removed therefrom. This liquid is dried for at least 3 hours in an 80° C. vacuum oven. Subsequent fractions are obtained by the addition of a much smaller quantity of alcohol, 1 or 2 milliliters usually being sufficient. It is usually desirable to add an antioxidant to each fraction. The inherent viscosity of each fraction can then be determined by dissolving it again in toluene. The result of such a fractionation procedure will show a plurality of types of polymer in the products of this invention. Generally, 10 fractions will produce sufficient points to show a curve indicating these 2 fractions although 20 or more fractions can be taken. Furthermore, one or more fractions can be refractionated or several fractions can be combined and refractionated to define the molecular weight or inherent viscosity distribution more completely. From this procedure, it is also possible to determine the amounts of each type of polymer present.

As many possible embodiments can be made of this invention without departing from the scope thereof, it is to be understood that all matter herein set forth is to be interpreted as illustrative and not as unduly limiting the invention.

I claim:
1. A rubbery product comprising (A) polybutadiene having an inherent viscosity of 0.75 to 3, said polybutadiene formed by 85 to 100 percent cis-1,4-addition, and (B) polybutadiene having an inherent viscosity of 6 to 20 the weight of (B) being 2 to 40 percent of the total of (A) and (B), the inherent viscosity being determined from the viscosity of a solution of 0.1 gram of polymer per 100 milliliters of toluene at 25° C.

2. A rubbery product comprising (A) polybutadiene having an inherent viscosity of 0.75 to 3, said polybutadiene formed by 85 to 100 percent cis-1,4-addition, and (B) polybutadiene having an inherent viscosity of 6 to 20, the weight of (B) being 5 to 30 percent of the total of (A) and (B), the inherent viscosity being determined from the viscosity of a solution of 0.1 gram of polymer per 100 milliliters of toluene at 25° C.

3. The product of claim 2 wherein said component (B) is formed by 85 to 100 percent cis-1,4-addition.

4. A rubbery product comprising (A) polybutadiene having an inherent viscosity of 0.75 to 3, said polybutadiene containing cis-1,4, trans-1,4, and vinyl addition, at least 85 percent of the polymer formed by cis-1,4-addition, and (B) polybutadiene having an inherent viscosity of 6 to 20, the weight of (B) being up to 40 percent of the total of (A) plus (B), the inherent viscosity being determined from the viscosity of a solution of 0.1 gram of polymer per 100 milliliters of toluene at 25° C.

References Cited by the Examiner

UNITED STATES PATENTS

| | | | |
|---|---|---|---|
| 2,657,190 | 10/1953 | Banes et al. | 260—894 |
| 2,721,185 | 10/1955 | Schulze et al. | 260—894 |
| 2,730,515 | 1/1956 | McCracken et al. | 260—80.7 |
| 2,964,083 | 12/1960 | Pfau et al. | 260—894 |
| 3,060,989 | 10/1962 | Railsback et al. | 260—5 |
| 3,159,691 | 12/1964 | Kraus | 260—894 |

FOREIGN PATENTS 144,858  1/1952  Australia.

OTHER REFERENCES

Kraus et al.: "The Rubber and Plastics Age," vol. 38, No. 10 pp. 880–892, October 1957.

MURRAY TILLMAN, *Primary Examiner.*

LEON J. BERCOVITZ, *Examiner.*

J. W. SANNER, G. F. LESMES, *Assistant Examiners.*